United States Patent Office 2,727,827
Patented Dec. 20, 1955

2,727,827

LIGHTWEIGHT AGGREGATE AND METHOD OF PRODUCING THE SAME

Jack O. Chertkof, Baltimore, Md.

No Drawing. Application March 12, 1953,
Serial No. 342,033

10 Claims. (Cl. 106—308)

This invention relates to an improved method or process for treating lightweight aggregates such as expanded volcanic glasses, Perlite minerals, and the like. These expanded lightweight aggregates are used for the production of low density bonded compositions such as lightweight concrete, plasters and related materials employed in building construction.

Lightweight or low density concretes or bonded compositions having hydraulic binders and low weight aggregates have become of importance in many phases of industry. The use of these low density compositions allows the preparation of structural materials of light weight having satisfactory strength for the purposes for which they are employed, and having varying degrees of insulation value and fire resistance.

In prior art practices these lightweight compositions composed of expanded mineral aggregates and hydraulic binders have presented problems of uniformity which have restricted their commercial application. The air-containing lightweight aggregates tend to float when they are put into suspension with hydraulic binders while the heavier binders settle to the bottom. The expanded aggregates have microscopic irregular voids and expanded surfaces, which surfaces are difficult to coat with liquids because of capillary bridging. In the past these difficulties have caused serious nonuniformity in the final product owing to the onset of segregation and stratification.

Lightweight aggregates prepared according to prior art practices showed high absorption of liquids, necessitating the use of excessive amounts of liquids such as water to satisfy the demand of both the hydraulic binder and the aggregate.

Prior art aggregates being structurally weak tended to be crushed during manipulation whereby a considerable amount of the air component was released from the mixture with loss of volume of the final product. This loss of volume occasioned nonuniformity of structural strength, density, and insulating values. It was therefore difficult to predict their performance. In consequence structures involving their application were difficult to design.

Lightweight insulating concrete and other related compositions of predictable and reproducible character have a great value in commerce. Lightweight structural compositions readily take their place in industry, based on their economic value of use. Many arts and methods have been devised to have the lightweight aggregates function satisfactorily in compositions or in concrete, so as to have industry accept them on a large scale because of their insulating and lightweight properties. Before said aggregates could be accepted, a particular aggregate in a concrete or composition for lightweight, insulating, structural or other use would have to give constant and uniform results for yield, strength, and insulation. Air release inhibitors have been added to the lightweight aggregates either in powder or liquid spray. These were presumed to control the amount of the inhibitor per unit of aggregate. The inhibitor was to act with the water or aqueous binder, varying either the surface tension or amount of entrained air, depending on the type of inhibitor. Suggestions have been made heretofore for the purpose of entraining or entrapping air in the composition. However, strengths, yields, and densities of compositions, which are the prime requisites for wide acceptance, could not be closely controlled under these conditions, as the air could not be controlled in the composition or the surface tensions reduced, due to the microscopic surfaces and varying capillary bridging.

This invention contemplates an entirely different approach which has proven successful. The invention has found acceptance on the economical basis of value for lightweight aggregates for use in compositions and concrete. The final product and method of preparing same meets the requirements of constant yield, strength and density with light weight aggregates.

Lightweight aggregates such as those from Perlite usually are processed by heating same, which heating dries and expands each particle of aggregate, which particle size can be controlled by the sizing of the ore and/or separation of the finished product. The density of the finished aggregate may vary within wide limits, depending upon its use, anywhere from 3 lbs. per cu. ft. to 50 lbs. per cu. ft., said density being further dependent upon the type of ore and process used in manufacturing. When close control of processing has been accomplished, the expanded aggregate will not vary within wide limits of density—that is, it can be controlled for better results of compositions, perhaps within limits of 2 to 8 lbs. on a predetermined particle size and density. For example, if a required density of lightweight aggregate of 7 lbs. per cu. ft. has been determined, the screen fractions may vary in density from 5 to 12 lbs. If the requirement be 20 lbs. per cu. ft. density, then the screen fractions may vary from 15 to 30 lbs. The closer and the more exacting the process of expanding, the closer and most exacting the individual fractional screen densities will be.

Further, when processing Perlite and expanding same for a lightweight aggregate it is important to produce a hard aggregate with the minimum characteristics to prevent friability. This, therefore, requires a hard shell around the air cells and a minimum number of soft projecting points or burrs. It has been found that the hardness can be increased and the friability decreased during the expanding operation: after the ore has passed through the flame and expanded, but before the expanded Perlite has passed out of the furnace to the collecting system.

If the Perlite is held in the furnace after it has expanded, at an approximate temperature of 2000° F. for a very short time (1 to 15 seconds depending on size of expanded Perlite particle), then the soft projecting points or burrs will fuse or melt into the particle of expanded Perlite itself, making it harder and less friable. This also has an added advantage, because this secondary operation of fusing or melting closes some of the pores of the particle of Perlite and decreases adsorption.

This lightweight aggregate then bulks itself when put into composition, the same as any other material that has varying particle sizes, and the wet or aqueous volume is always less than the dry volume, if the aggregate does not expand. The wet or aqueous volume can be determined for every lightweight aggregate for a given variable size and density. Usually ninety-five per cent of the lightweight aggregate particle sizes are larger than the particle sizes of the binder. Where a denser composition is required for strength, such as in lightweight structural concrete or composition, more binder particles or finer aggregate particles are used to fill the voids.

Most lightweight aggregates usually float. The particles of the binder, being heavier, sink when put into an aqueous mixture or composition. Therefore, in lightweight concrete considerable separation takes place before the composition sets or hardens.

In order to accomplish the results of this invention, a nonionic surface active agent which will reduce the surface tension of the lightweight aggregate particle having a maximum surface because of its microscopic irregularities and consequently high resistance to capillary attraction, has been found most satisfactory. It has been found that the nonionic inhibitors are the best for reducing surface tension and permitting high dispersion both of lightweight aggregates and particles of binder in compositions or concrete. These nonionic surface active agents must be of specific character and applied in a specific manner as outlined further according to this invention. When so selected and incorporated in the aggregate, they not only act as excellent inhibitors of air release causing the formation of small air bubbles, but also impart a degree of thixotropy or high viscosity to the mixtures of aggregate, water, and hydraulic binder. As a result of this thixotropic character of the surface active agent, the mix is smooth and acts as if "lubricated."

Since each particle of lightweight aggregate touches the surrounding particles and the binder is for the purpose of tying the lightweight aggregate particles together to form a uniform composition for strength and density, dispersion and surface tension are important factors. The lightweight particles themselves are of such light densities that the additional amount needed for bulking a unit volume does not increase objectionably the density of composition. The strengths have been increased as much as three hundred per cent, due to the uniformity of product and the density being exact and controlled.

It has been found and is claimed by this invention that if the lightweight aggregates are treated by an inhibitor or air entrainment agent in the gaseous state, the microscopic surfaces will be coated and the surface tension reduced so that the capillary attraction to these surfaces has been increased. Coating of lightweight products by a gaseous inhibitor furnishes the inhibitor in the finest state of particle size, so that every microscopic surface of the lightweight aggregate can be contacted by this inhibitor.

Porous aggregates including Perlite of solid structure have forces specifically characteristic of each aggregate, which adsorb gases and liquids and the amounts are proportional to the surface tension, size and shape of the voids and the composition of the aggregate. The gaseous treatment which penetrates the smallest voids and covers all surfaces, permits the inhibitor to coat said surfaces and when the aggregate is used in composition with a mixture of liquids and binder, the liquid then expands the inhibitor in the void and forces the adsorbed liquid and binder out of said void and seals to void against further adsorption. This function of the inhibitor permits the mixture to be uniform in yield and maximum in strength.

The inhibitor was originally applied in a gaseous state for the purpose of reducing surface tension of all microscopic surfaces in the void, which in turn reduces adsorption in the initial stage, both being one and the same thing, but the secondary action, or expansion of the excess inhibitor thereby pushing out the liquid and binder used in the composition further decreases the adsorption of the liquid and reduces it to a minimum amount.

Once the secondary action has taken place and mixing of the composition has been completed, the secondary action reverses itself and the secondary adsorption will take place unless some method is used to prevent this action. This is controlled by the addition of an extremely fine particled aggregate which particles surround the prime aggregate and effectively seal all the voids, which action thereby permits maximum sealing of voids so that both liquid and binder cannot enter. Should it be desired to permit the liquid only from the composition to enter the voids, which is advantageous in many compositions, then the extremely fine particles of aggregate used for sealing can be so proportioned as to permit filtering of the liquid into the voids to the exclusion of the binder.

In many cases it is most advantageous to introduce the inhibitor during the course of expanding the lightweight aggregate, because high temperatures are required for this purpose, in some cases the temperature exceeding 2700° F. When these temperatures are reached, the product then passes through the cooling stages. The product is collected, whereby the temperature is reduced from the maximum reached in the process to the temperature where the product can be bagged.

A point can be found where it is most advantageous to introduce the inhibitor so that the temperature of the surrounding media such as pipes, bins, air or flue gas, and the temperature of the lightweight aggregate itself will permit the volatilization of the inhibitor, either in the collecting system or when said inhibitor comes in contact with the lightweight aggregate, thereby coating every microscopic surface. Inhibitors will vary somewhat as to temperatures of volatilization and the exact point of introduction will also depend on the type of inhibitor used. Different end products will have different temperatures at point of introduction of the inhibitor and different inhibitors will require different pressures for application of the inhibitor.

The surface active agents found useful in the practice of this invention are organic liquids comprising alkyl aryl polyether alcohols which may be represented by the formula $(R(OCH_2CH_2)_xOH)$ in which R represents an organic radical such as substituted phenyl, xylyl, etc. These compounds being polymers $x$ has its usual representation. Specific examples are ethyl phenyl polyethoxy ethanol; methyl phenyl polyethoxy ethanol; butyl phenyl polyethoxy ethanol; ethyl phenyl polyethoxy propanol; methyl phenyl polyethoxy butanol and xylyl polyethoxy ethanol.

In addition to the above, agents useful for the purpose contemplated are alkyl aryl polyethoxyethers and polyoxyethylene thioethers. Specific examples of the ethers are propyl phenyl polyethoxy ether; butyl phenyl polyethoxy ether, amyl tolyl polyethoxy ether and methyl phenyl polyethoxy ether. The thioethers are a somewhat limited class represented by the polyoxyethylene sulfides; the formula for same may be written $(OCH_2CH_2)_xS$ where the value of $x$ is greater than 2 and has a maximum value of the order of $3_0$. In other words, this designation would represent a whole series of compounds having varying molecular weights.

As is apparent, all of the above agents contain the portion: $(OCH_2CH_2)_x$, which may suitably be designated a polyoxyethylene portion, and the agents themselves may conveniently be referred to as polyoxyethylene compounds.

The agents specifically referred to above have a strongly polar group which is hydrophylic or attracted to water, and a nonpolar group which is hydrophobic or attracted to nonaqueous materials. Materials of this class show solubility in water and at room temperatures are excellent wetting agents. At room temperatures they show low vapor pressures, having flash points between 400 and 500° F., fire points between 500 and 600° F., having appreciable vapor pressures above 400° F., and decomposing in the vicinity of their fire points. They are therefore high boiling point stable organic liquids which can be vaporized and caused to contact the particles of the lightweight aggregate in vapor form at temperatures in the range of their flash points. They are introduced either as anhydrous liquids or in solution with water by spraying under such air pressures in suitable atomizers so that an exceedingly fine spray is formed. This spray enters the system at a point where the temperature of the aggregate and its conveying air approximates that of the flash point of the surface active agent. The surface active agent is completely vaporized, coming in contact with every particle of the expanded aggregate, e. g., Perlite, which in traveling forward in the system cools and causes the surface active agent to condense on the surfaces of the particles of the lightweight aggregate. This achieves a uniformity unobtainable by hithertofore conventional means. In an expanded Perlite of the following screen composition

| | | |
|---|---|---|
| +16 | 15%±5% | 10—20 |
| −16+30 | 30%±5% | 25—35 |
| −30+50 | 30%±5% | 25—35 |
| −50+100 | 20%±5% | 15—25 |
| −100 | 5%±5% | 0—10 | having an apparent density of 7.5 lbs. per cu. ft., 5 to 6 cc. (5 to 6 grams) of anhydrous surface active agent of the type described per cubic foot of aggregate is a preferred concentration, introduced into the system at a point where the aggregate temperature is from 500 to 600° F. and suffering a temperature drop as a result of cooling of approximately 100° F. a minute.

The amount of surface active agent was not changed when lightweight aggregates of 10, 12, and 15 lbs. per cu. ft. were produced to meet specific industrial conditions.

The nonionic surface active agents of the chemical type described above are freely soluble in water. Water solutions may be made in any concentrations and pressure sprayed into the system for the manufacture of aggregate in the same manner as when the anhydrous material was employed. The water of the solution vaporizes rapidly at temperature below that at which the surface active agent is converted to vapor; the water therefore may serve as a mild cooling agent of the gas stream carrying the aggregate. This cooling does not have any detrimental effect on the process or product. As the aggregate cools, the surface active agent may condense and at lower temperatures the water in the form of steam as the result of vaporization may also condense. The aggregate normally has an equilibrium moisture content of about 5% by weight.

In making a lightweight concrete with the product of this invention, reproducible results are obtained. In ordinary concrete made with sand and gravel, a typical mix may call for 5 to 7 gallons of water per sack of cement. With a Perlite replacing the sand and gravel, 15 to 20 gallons of water per sack of cement may be needed.

When one bag of standard Portland cement, A. S. T. M. Type 1, is mixed with two sacks of expanded aggregate made under this invention, where each sack has a volume of 4 cu. ft., and 15 gallons of water are employed per sack of cement, reproducible wet poured densities are obtained after four minutes' mixing in a cement mixer of 37 lbs. per cu. ft. With such a mixture a reproducible "slump" of 5 in. is obtained following the "slump" procedure of the Portland Cement Association.

Having described my invention what I claim is:

1. A water wettable lightweight aggregate comprising expanded particles of volcanic glass, said particles having microscopic irregular voids and expanded surfaces coated throughout their extent with a fine film of an air release inhibitor consisting of a liquid, non-ionic, surface-active, water-soluble polyoxyethylene thioether; said inhibitor having the formula $(OCH_2CH_2)_x S$, where $x$ is an integral number greater than 2 and having a maximum value of 30.

2. The coated aggregate of claim 1 in which said aggregate is Perlite.

3. A water wettable lightweight aggregate comprising expanded particles of volcanic glass, said particles having microscopic irregular voids and expanded surfaces coated throughout their extent with an air release inhibitor, said inhibitor being a stable, high boiling, non-ionic, surface-active, water-soluble organic liquid consisting of a polyoxyethylene compound selected from the class consisting of an alkyl aryl polyoxyethylene alcohol, an alkyl aryl polyoxyethylene ether, and a polyoxyethylene thioether, said inhibitor having a flash point in the range of 400 to 500° F., a fire point between 500 to 600° F., and low vapor pressure at room temperature, and said inhibitor being vaporizable at a temperature in said flash point range and decomposable at a temperature in the vicinity of said fire point.

4. The coated aggregate of claim 3 in which said aggregate is Perlite.

5. The coated aggregate of claim 3 wherein said inhibitor is an alkyl aryl polyoxyethylene alcohol.

6. The coated aggregate of claim 3 wherein said inhibitor is an alkyl aryl polyoxyethylene ether.

7. The coated aggregate of claim 3 wherein said inhibitor is a polyoxyethylene thioether.

8. The coated aggregate of claim 5 in which said inhibitor is an ethyl phenyl polyoxyethylene alcohol.

9. The coated aggregate of claim 6 in which said inhibitor is a propyl phenyl polyoxyethylene ether.

10. A water wettable lightweight aggregate comprising expanded particles of volcanic glass, said particles having microscopic irregular voids and expanded surfaces coated throughout their extent with an air release inhibitor, said inhibitor being a stable, high boiling, non-ionic, surface-active, water-soluble organic liquid consisting of a polyoxyethylene compound selected from the class consisting of an arkyl aryl polyoxyethylene alcohol $$R(OCH_2CH_2)_xOH$$

an alkyl aryl polyoxyethylene ether $R(OCH_2CH_2)_x$, and a polyoxyethylene thioether $(OCH_2CH_2)_xS$, where R represents an alkyl aryl portion and $x$ indicates that the compound is a polymer, said alkyl aryl portion comprising a benzene ring having at least one alkyl group substituted therein, said alkyl group having from 1 to 5 carbon atoms, said inhibitor having a flash point in the range of 400 to 500° F., a fire point between 500 to 600° F., and a low vapor pressure at room temperature, and said inhibitor being vaporizable at a temperature in said flash point range and decomposable at a temperature in the vicinity of said fire point.

References Cited in the file of this patent

UNITED STATES PATENTS

| | | |
|---|---|---|
| 2,314,111 | Tucker et al. | Mar. 16, 1943 |
| 2,323,749 | Dieterle | July 6, 1943 |
| 2,438,318 | Johnson | Mar. 23, 1948 |
| 2,589,705 | Kistler | Mar. 18, 1952 |
| 2,625,512 | Powell | Jan. 13, 1953 |